UNITED STATES PATENT OFFICE.

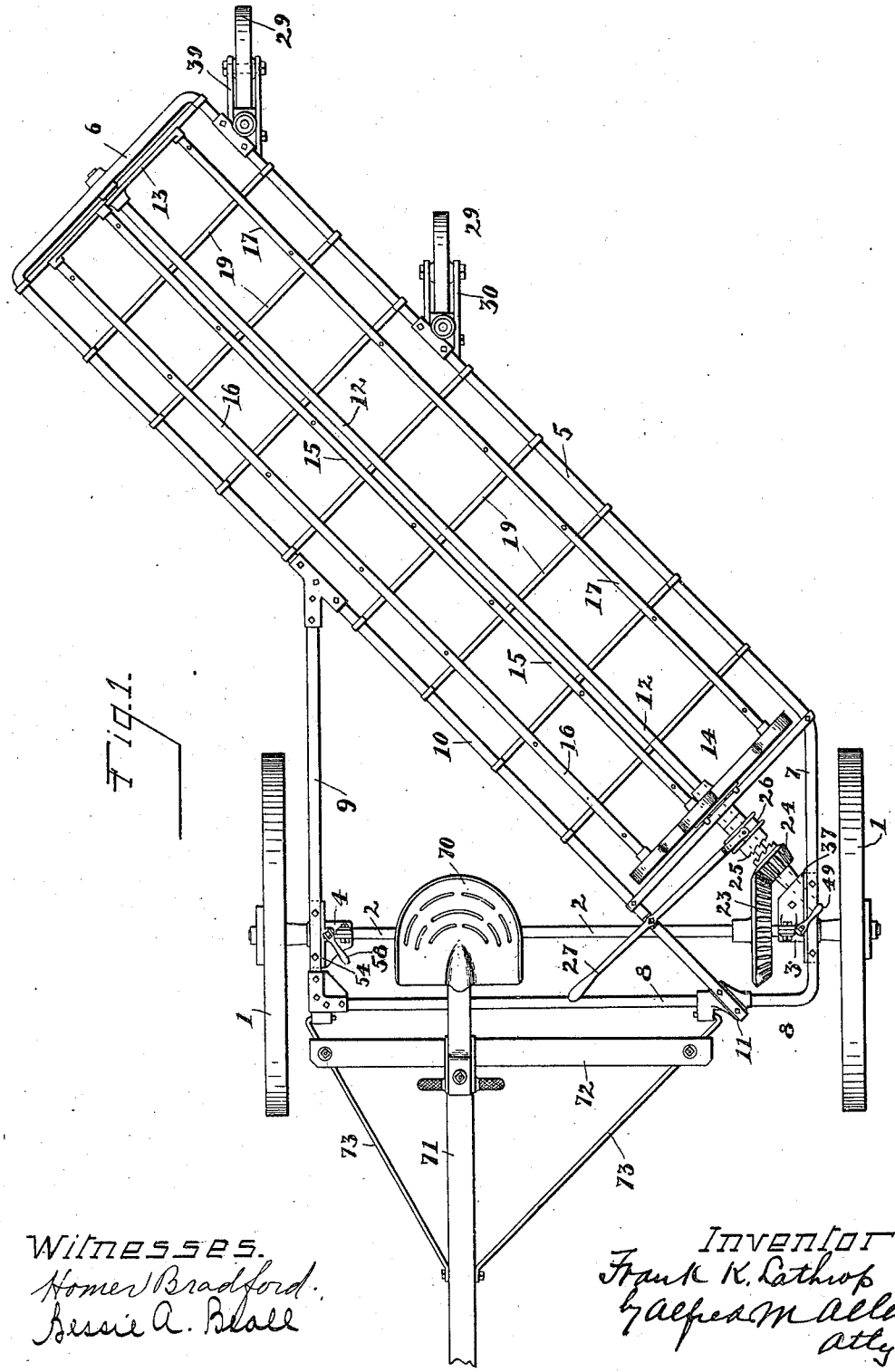

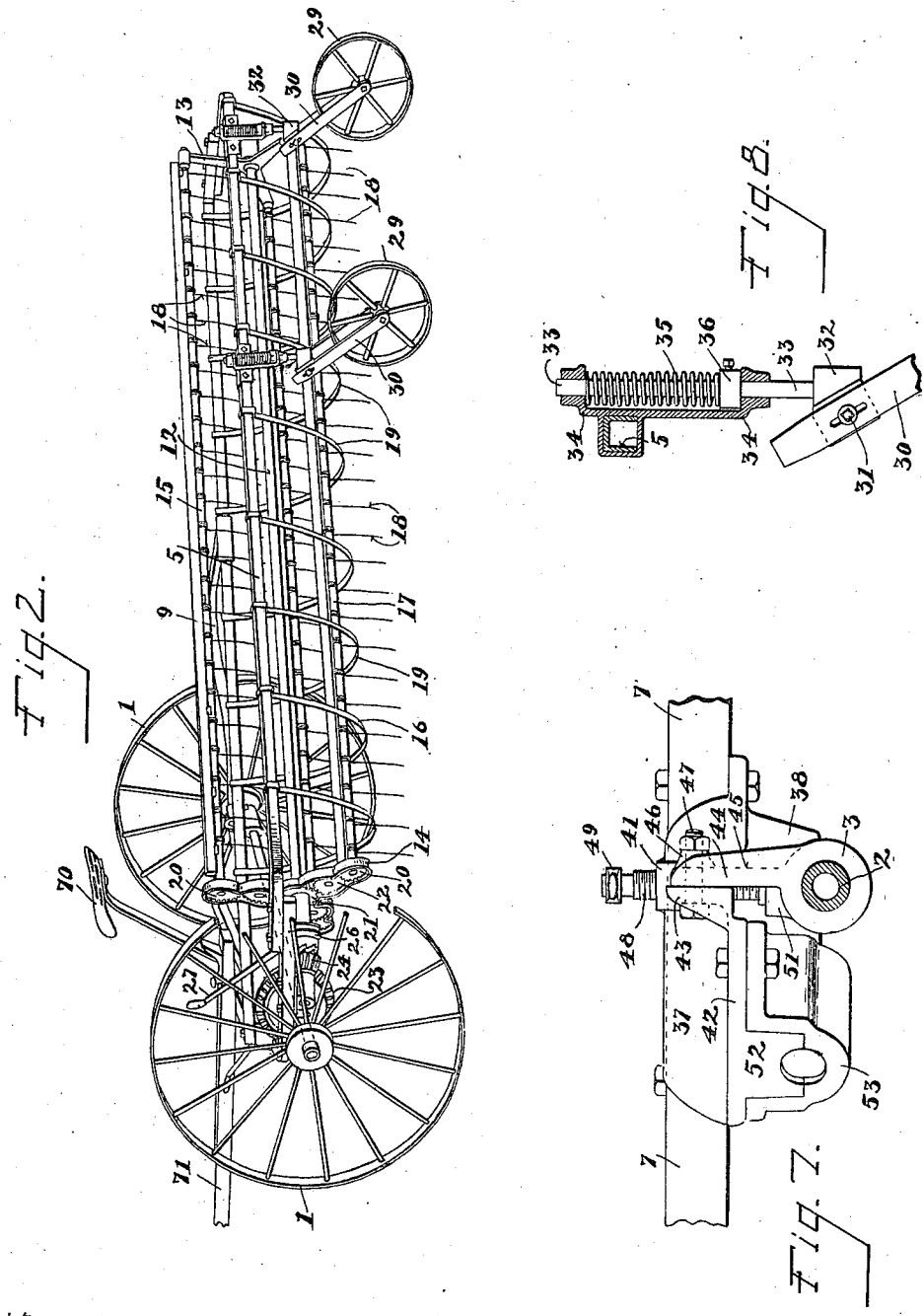

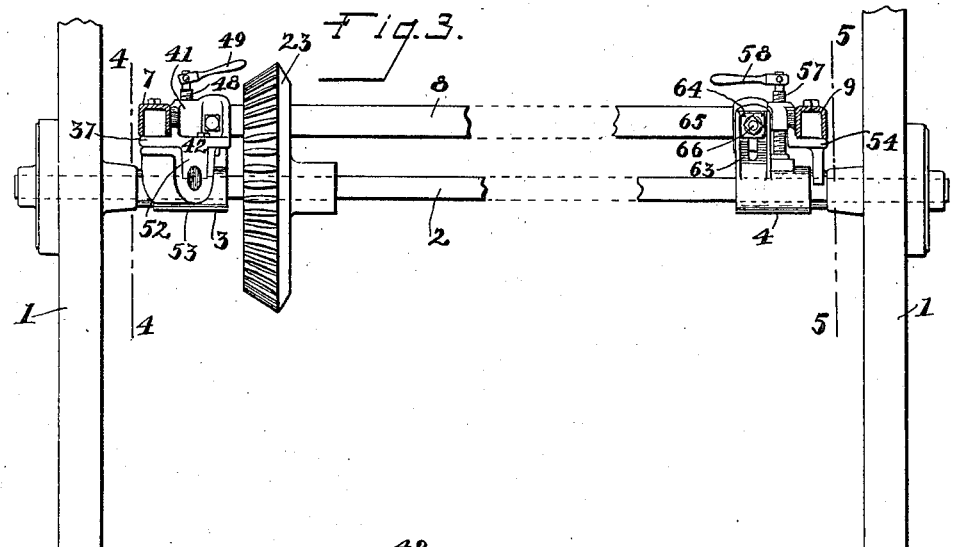
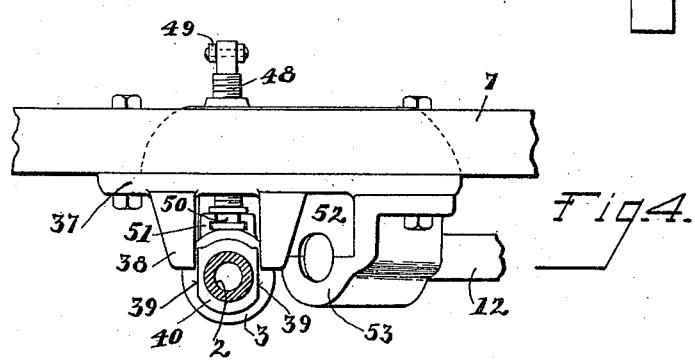
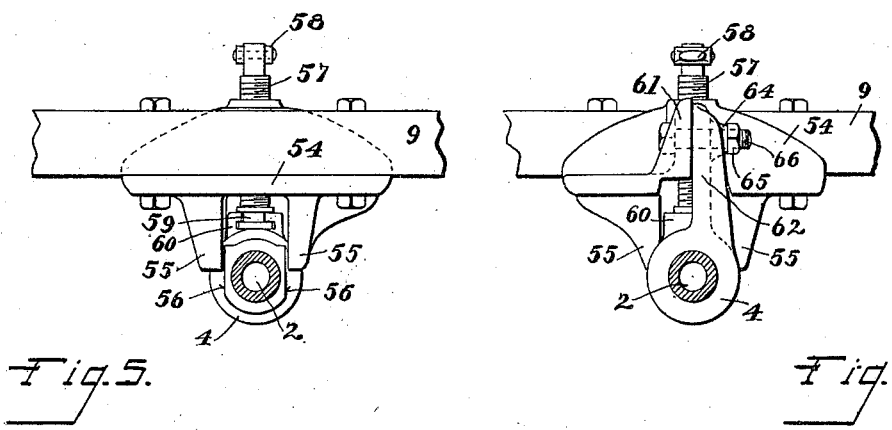

FRANK K. LATHROP, OF DAYTON, OHIO, ASSIGNOR TO THE OHIO RAKE COMPANY, OF DAYTON, OHIO, A CORPORATION OF OHIO.

SIDE-DELIVERY HAY-RAKE.

974,893.

Specification of Letters Patent.　　Patented Nov. 8, 1910.

Application filed September 21, 1908. Serial No. 453,955.

*To all whom it may concern:*

Be it known that I, FRANK K. LATHROP, a citizen of the United States, residing in Dayton, county of Montgomery, and State of Ohio, have invented certain new and useful Improvements in Side-Delivery Hay-Rakes, of which the following is a full, clear, and exact description, reference being had to the accompanying drawings, forming part of this specification.

My invention relates to improvements in hay rakes which are provided with a diagonal rake frame carrying rotating rake shafts, upon which the rake teeth are mounted, so as to rake and deliver the hay with the forward movement of the implement at one side of the machine, and in which the rear end of the rake frame is supported by caster wheels.

It has been usual to arrange for adjustment in height of these caster wheels, so as to raise or lower the outer end of the frame to bring the rake teeth into proper contact with the material to be gathered.

Heretofore the entire rake frame has not been adjustable, and the adjustment being at the outer end only, when the frame is dropped for raking thin hay, the ends of the teeth are apt to catch or bend or break, and at the same time a very heavy side draft on the implement is the result.

It is the special object of my invention to remedy this defect by that certain novel construction and arrangement of parts, to be hereinafter particularly pointed out and claimed, whereby provision is made for the vertical adjustment of the entire rake frame to suit the requirements, and in which the rake shafts and teeth are maintained in a horizontal level position at both ends, thus preventing damage to the rake teeth, and avoiding any undesirable side draft on the implement.

In the drawings Figure 1 is a top plan view of my improved hay rake. Fig. 2 is a rear perspective view of the same. Fig. 3 is a somewhat enlarged rear elevation, broken away at the center of the carrying wheels and axle, showing the construction for mounting the rake frame on the axle. Fig. 4 is a detailed side elevation of the axle support for the rake frame, taken on the lines 4, 4, of Fig. 3. Fig. 5 is a similar side elevation taken on the lines 5, 5, of Fig. 3. Fig. 6 is a similar side elevation of the part shown in Fig. 5, taken on the opposite side. Fig. 7 is a similar side elevation of the parts shown in Fig. 4, taken on the opposite side, and Fig. 8 is a detailed view of the attaching device for the caster wheels.

1, 1 are the carrying wheels of the implement, mounted on the axle 2, which turns with the wheel.

3 and 4 are journal boxes located inside the carrying wheels, and through which the axle 2 passes, and upon these journal boxes the rake frame is mounted. This frame is preferably constructed of a steel U-bar 5, bent around at the outer end 6, to form a substantial rectangular frame, which is secured diagonally to the carrying axle, one end of this frame 7, at its inner end, being turned parallel with the plane of the carrying wheels, and thence over the axle and parallel thereto to form the front portion 8 of the frame, and thence rearwardly as a brace 9, to the main body of the frame, while the inner end of the frame 10 is extended diagonally and securely bolted at 11, to the front bar 8 of the frame.

Mounted in suitable journal bearings in each end of this rake frame, and obliquely to the line of draft is the main rake shaft 12. This rake shaft carries spiders 13 and 14 at either end, and in the outer ends of the spider arms are mounted the rake teeth shafts 15, 16 and 17, and on these shafts at suitable intervals the rake teeth 18 are mounted in the usual way.

19 are the usual downwardly curved guards to prevent the hay from being lifted by the rake teeth, and these guards are rigidly secured to front and rear of the rake frame.

Mounted on the inner ends of each rake tooth shaft, and carried by the spider 14, is the gear 20, and loosely mounted on the main shaft 12 in fixed position so that it cannot rotate, is the gear 21 and 22, 22, are idler gears interposed between the fixed gear 21, and the gears 20 on the ends of the rake teeth shafts.

23 is the main driving gear keyed on the carrying axle 2, so as to rotate with the carrying wheels in the forward draft of the implement. This gear meshes with the beveled clutch gear 24, loosely mounted on the rake shaft 12, which gear is provided with the clutch teeth 25, which are engaged by the corresponding teeth on the clutch collar 26, slidably keyed on the shaft 12, and shifted by the hand lever 27, so that the rake shaft and the rake heads may be conveniently thrown into and out of action. Inasmuch as it is designed to adjust the shaft carrying the clutch gear 24 vertically with reference to the shaft carrying the main driving gear 23 as will be hereinafter described, the teeth of these two gears are formed with convex engaging surfaces as illustrated in Figs. 1 and 3.

When the two shafts and the gears are in their middle position, the middle portions of the convex teeth intermesh. When they are adjusted to extreme high or low position, the teeth engage at one end or the other of their side surfaces.

When thrown into action the rake shaft 12, will be rotated carrying with it the spiders and the rake teeth shafts and rake teeth. Inasmuch as the gear 21 is fixed from rotation, the rotation around the shaft of the gear 20, will cause the rake teeth shafts to rotate and thus maintain the rake teeth in a constant vertical position throughout the entire revolution of the rake heads.

The rear end of the rake frame is preferably supported by a pair of caster wheels 29, 29. The forks 30 in which these caster wheels are journaled are slotted at their attaching ends and secured by the bolts 31 to the castings 32, which carry vertical pins 33 which pass through the arms of the brackets 34, secured to the frame, while coiled springs 35 bear between the collars 36 adjustably mounted on the pins 33 and the upper arms of the brackets. In this way the caster wheels can be adjusted as to height by the bolts 31, and the coiler springs 34, allow the caster wheels to yield in passing over the inequalities of the ground.

So much of the implement as above described, comprises for the most part, old and well known constructions which form no part of my present invention, and the foregoing description will be sufficiently clear to explain the nature of my improvements, which relate as heretofore set forth, to the adjustment of the rake frame with reference to the carrying axle of the implement. This adjustable construction is more particularly illustrated in Figs. 3 to 7. Securely bolted to the side piece 7 of the rake frame, above the carrying axle, is the angle plate casting 37. This angle plate casting is provided with two depending lugs 38, 38 which engage the flattened sides 39, 39 of the sleeve extension 40, of the journal box 3. The inner or rear side of the angle plate casting 37, is provided with a boss 41, and an angular web portion 42. The front face of this web portion forms a vertical face against which is secured the slotted plate 44, integral with and projecting upward from the journal box 3. The outer side of this journal box plate is ribbed at 45, and engaged by the ribbed washer 46, mounted on the securing bolt 47, so as to hold the two plates securely together in any position to which they may be adjusted.

48 is a screw turned by the handle 49, screw threaded down through the boss 41 and carrying on its lower end a double head 50, which engages the slotted groove formed in the block 51 on the journal box 3 so that the screw 48 is held in connection with the journal box, while permitted to turn in the boss on the casting 37, thus adjusting the distance between the casting and the journal box. The lower portion of the web 42 of the casting 37 is formed into the upper half of a journal box 52, and the lower half of this journal box 53 is securely bolted to the casting 37, and web portion thereof. This journal box forms a journal bearing for the rake shaft 12.

It will be evident from this construction, that inasmuch as the rake frame is bolted securely on the angular casting 37, that as the screw 48 is turned, the attaching bolt 47 being first loosened, this end of the frame will be raised or lowered with reference to the carrying axle.

The opposite journal box 4 is adjustably secured to the side brace 9 of the rake frame, in the same way except that no provision need be made for supporting any other portion of the rake, as was necessary in connection with the journal box 3, in supporting the rake shaft 12. 54 is the angle plate casting provided with the depending lugs 55, 55, engaging the flattened portion 56, of the journal box.

57 is the adjusting screw with handle 58, in screw threaded engagement with the boss on the angle plate, and provided with the double head 59, engaging the block 60 on the journal box.

The casting 54 is provided with a vertical face 61 to engage the slotted vertical plate 62 on the journal box 4, and the outer face of this slotted plate 62 is ribbed at 63 and engaged by the ribbed washer 64, held by the adjusting nut 65 on the connecting bolt 66.

When it is desired to adjust the frame for the varying conditions of the material to be raked, the caster wheels sustaining the outer end of the frame are adjusted as described, and the connecting bolts which secure the rake frame castings to the journal boxes being loosened, the adjusting screws 48 and 57 are turned to raise or lower the entire front end of the frame, and the bolts are then tightened so that the entire frame being adjusted, the action of the implement is the same as it was before the adjustment, and all undue side draft is avoided.

As the beveled pinion on the rake shaft is raised or lowered with this adjustment with reference to the driving gear, the pinion and gear are constructed with rocker shaped teeth as shown, to permit of this adjustment.

The usual seat 70 for the driver, is mounted on the end of the tongue 71 and the brace 72 in this frame is provided with the side braces 73, 73, which are coupled to the rake frame.

Having thus described my invention what I claim as new and desire to secure by Letters Patent, is:

1. In a hay rake, the combination, with the carrying wheels and axle therefor, of a rake frame mounted thereon, and extending diagonally rearward therefrom, castings secured to the rake frame, with journal boxes on the axle, and adjusting screws connecting said castings and journal boxes for adjusting the height of the rake frame on the axle with means for locking the journal box to the rake frame castings in any adjusted position.

2. In a hay rake, the combination, with the carrying wheels and axle therefor, of a rake frame mounted thereon, and extending diagonally rearward therefrom, castings secured to the rake frame, with journal boxes on the axle, lugs on the castings to embrace the journal boxes, and adjusting screws connecting said castings and journal boxes for adjusting the height of the rake frame on the axle and means for locking the casting lugs to the journal box in any adjusted position.

3. In a hay rake, the combination, with the carrying wheels and axle therefor, of a rake frame mounted thereon and extending diagonally rearward therefrom, with a rake shaft mounted in said frame, and means for rotating the rake shaft from the carrying axle, castings secured to the rake frame with journal boxes on the axle, one of said castings carrying a journal box for the rake shaft, and adjusting screws connecting said castings and axle journal boxes for adjusting the height of the rake frame on the axle.

FRANK K. LATHROP.

Witnesses:
E. J. FINKE,
H. G. KEMPER.